US008286426B2

(12) United States Patent
Bishop

(10) Patent No.: US 8,286,426 B2
(45) Date of Patent: Oct. 16, 2012

(54) DIGITAL HYDRAULIC SYSTEM

(75) Inventor: Elton D. Bishop, Fort Wayne, IN (US)

(73) Assignee: Digital Hydraulic LLC, Fort Wayne, IN (US)

( * ) Notice: Subject to any disclaimer, the term of this patent is extended or adjusted under 35 U.S.C. 154(b) by 949 days.

(21) Appl. No.: 12/352,398

(22) Filed: Jan. 12, 2009

(65) Prior Publication Data

US 2009/0178399 A1 Jul. 16, 2009

Related U.S. Application Data

(63) Continuation-in-part of application No. 11/564,065, filed on Nov. 28, 2006, now Pat. No. 7,475,538.

(60) Provisional application No. 60/740,345, filed on Nov. 29, 2005.

(51) Int. Cl.
*F16D 31/02* (2006.01)

(52) U.S. Cl. ........................................... 60/413; 60/418

(58) Field of Classification Search .................... 60/413, 60/415, 418; 91/361, 363 R
See application file for complete search history.

(56) References Cited

U.S. PATENT DOCUMENTS 3,164,065 A 1/1965 Frantz
3,416,549 A 12/1968 Chaney et al.
3,552,275 A 1/1971 Chaney et al.
3,641,877 A 2/1972 Hebert
3,796,132 A 3/1974 Panissidi
5,058,384 A * 10/1991 Dunwoody ..................... 60/413
5,218,997 A 6/1993 Dunwoody
6,070,408 A * 6/2000 Clarke et al. .................... 60/418
6,567,013 B1 5/2003 Purkis et al.
6,575,237 B2 6/2003 Purkis et al.

* cited by examiner

*Primary Examiner* — Michael Leslie

(74) *Attorney, Agent, or Firm* — Taylor IP, P.C.

(57) ABSTRACT

A control system for a work machine having a hydraulic energy source, a hydraulic accumulator, a digital hydraulic system having a digital hydraulic transformer, a hydraulic actuator and a movable element. The hydraulic accumulator being fluidically couplable with the hydraulic energy source. The digital hydraulic system including a digital hydraulic transformer fluidically couplable with the hydraulic accumulator. The hydraulic actuator being fluidically couplable with the digital hydraulic transformer. The movable element being movable by the hydraulic actuator. The control system including means to estimate at least one of potential energy and kinetic energy in the movable element; means to measure a fill level of hydraulic fluid in the hydraulic accumulator; and means to vary the amount of hydraulic energy added to the hydraulic accumulator by the hydraulic energy source responsive to the potential energy, the kinetic energy and/or the fill level of the hydraulic accumulator.

20 Claims, 11 Drawing Sheets

| MODE OF OPERATION | 8A 4A 2A A | CUMULATIVE AREA |
|---|---|---|
| 1 | 0 0 0 0 | 0 |
| 2 | 0 0 0 1 | A |
| 3 | 0 0 1 0 | 2A |
| 4 | 0 0 1 1 | 3A |
| 5 | 0 1 0 0 | 4A |
| 6 | 0 1 0 1 | 5A |
| 7 | 0 1 1 0 | 6A |
| 8 | 0 1 1 1 | 7A |
| 9 | 1 0 0 0 | 8A |
| 10 | 1 0 0 1 | 9A |
| 11 | 1 0 1 0 | 10A |
| 12 | 1 0 1 1 | 11A |
| 13 | 1 1 0 0 | 12A |
| 14 | 1 1 0 1 | 13A |
| 15 | 1 1 1 0 | 14A |
| 16 | 1 1 1 1 | 15A |

DIGITAL HYDRAULIC SYSTEM

CROSS REFERENCE TO RELATED APPLICATIONS

This is a continuation-in-part of U.S. patent application Ser. No. 11/564,065, entitled "DIGITAL HYDRAULIC SYSTEM ", filed Nov. 28, 2006 now U.S. Pat. No. 7,475,538, which is incorporated herein by reference. U.S. patent application Ser. No. 11/564,065 is a non-provisional application based upon U.S. provisional patent application Ser. No. 60/740,345, entitled "DIGITAL HYDRAULIC SYSTEM", filed Nov. 29, 2005.

BACKGROUND OF THE INVENTION

1. Field of the Invention

The present invention relates to a control system for a hydraulic work machine, and more particularly the present invention relates to the monitoring of potential and kinetic energies in movable elements of a hydraulic work machine, and to the control of hydraulic energy added to the hydraulic system.

2. Description of the Related Art

Hydraulics has a history practically as old as civilization itself. Hydraulics, more generally, fluid power, has evolved continuously and been refined countless times into the present day state in which it provides a power and finesse required by the most demanding industrial and mobile applications. Implementations of hydraulic systems are driven by the need for high power density, dynamic performance and maximum flexibility in system architecture. The touch of an operator can control hundreds of horsepower that can be delivered to any location where a pipe can be routed. The positioning tolerances can be held within thousandths of an inch and output force can be continuously varied in real time with a hydraulic system. Hydraulics today is a controlled, flexible muscle that provides power smoothly and precisely to accomplish useful work in millions of unique applications throughout the world.

Work machines are commonly used to move heavy loads, such as earth, construction material, and/or debris. These work machines, which may be, for example, excavators, wheel loaders, bulldozers, backhoes, telehandlers and track loaders, typically include different types of work implements that are designed to perform various moving tasks. Work implements may be, for example, a loader, shovel, bucket, blade, or fork. For the purposes of the present disclosure, the term "work implement" may also include the individual components of the work implement, such as a boom or stick. The work implements of these work machines are commonly moved by hydraulic actuators powered by hydraulic systems, which use pressurized fluid to move the work implements.

In many situations, the work implement of the work machine is raised to an elevated position. As the work implement may be relatively heavy, the work implement gains significant potential energy when raised to the elevated position. When the work implement is released from the elevated position the potential energy is usually converted to heat when the pressurized fluid is throttled across a valve and returned to the tank. Some of the potential energy of a work implement in an elevated position may be captured by redistributing that energy into an accumulator as a volume of pressurized hydraulic fluid. The stored energy can be used to perform useful work at a later time.

In addition to potential energies associated with elevated implements of work machines, there may be substantial kinetic energy in implements moving linearly or rotatively at points in a work cycle. Examples of such points in work cycles include: a rapid decent of a work implement from an elevated position to a lower position, and the rotation of a work machine superstructure commonly referred to as the swing function. Upon deceleration of the moving work implement, some of the kinetic energy of a work implement in motion may be captured by redistributing that energy into an accumulator as a volume of pressurized hydraulic fluid. The stored energy can be used to perform useful work at a later time.

Hydraulic transformers known in the art are designed to be used in conjunction with constant or semi-constant supply pressure as the energy source. The energy source may be driven by any of a variety of prime movers such as a diesel engine, gasoline engine, or an electric motor, and the energy supplied by the energy source may be supplemented by energy delivered by a hydraulic accumulator. Typically, however, there are no means by which a prime mover is governed to add energy only up to a pressure level less than a preset supply pressure.

In order to take full advantage of the benefits allowed by the digital hydraulic system, it is necessary to control the energy input into the hydraulic system.

In the event that a work implement has substantial potential and/or kinetic energy, it is advantageous in terms of energy efficiency to maintain a capacity for energy storage in the hydraulic accumulator approximately equal to the cumulative potential and kinetic energies of the work machine such that a maximum amount of potential and kinetic energy may be redistributed to the accumulator.

What is needed in the art is a control system that controls hydraulic energy input by the prime mover based on potential and kinetic energies of the work machine.

SUMMARY OF THE INVENTION

The present invention provides a digital hydraulic system including a hydraulic actuator, a digital hydraulic transformer and/or a digital hydraulic pump utilized in a system to controllably provide power.

The invention in one form is directed to a control system for a work machine having a hydraulic energy source, a hydraulic accumulator, a digital hydraulic system having a digital hydraulic transformer, a hydraulic actuator and a movable element. The hydraulic accumulator being fluidically couplable with the hydraulic energy source. The digital hydraulic system including a digital hydraulic transformer fluidically couplable with the hydraulic accumulator. The hydraulic actuator being fluidically couplable with the digital hydraulic transformer. The movable element being movable by the hydraulic actuator. The control system including means to estimate at least one of potential energy and kinetic energy in the movable element; means to measure a fill level of hydraulic fluid in the hydraulic accumulator; and means to vary the amount of hydraulic energy added to the hydraulic accumulator by the hydraulic energy source responsive to the potential energy, the kinetic energy and/or the fill level of the hydraulic accumulator.

The invention in another form is directed to a control system for energy management of a work machine including means to measure the fill level of hydraulic fluid in an accumulator, means to estimate potential and kinetic energies of a work implement, and means to vary the amount of hydraulic energy added to the hydraulic accumulator by a hydraulic energy source.

An advantage of the present invention is that energy utilization in a work machine may be optimized for maximum efficiency.

Another advantage of the present invention is that no energy will be intentionally wasted upon redistribution of potential and kinetic energies in work implements.

Yet another advantage of the present invention is that it can be utilized in four quadrant operation.

Yet another advantage of the present invention is that it requires less cooling of the hydraulic fluid.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
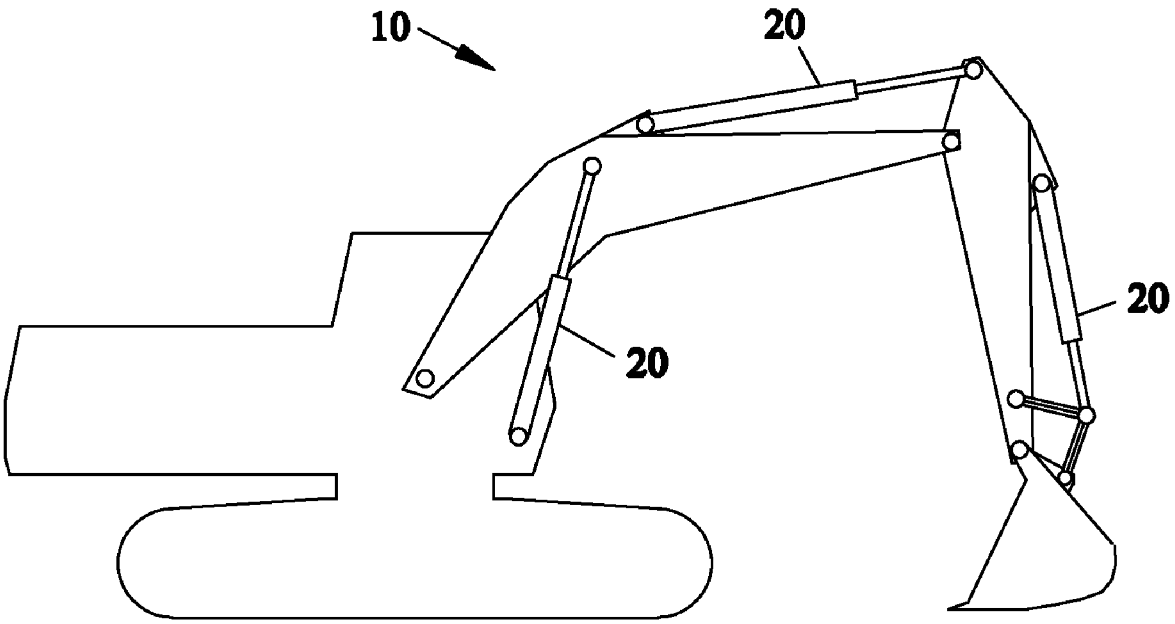
FIG. 1 illustrates a backhoe utilizing an embodiment of a digital hydraulic system of the present invention.
Figure 2:
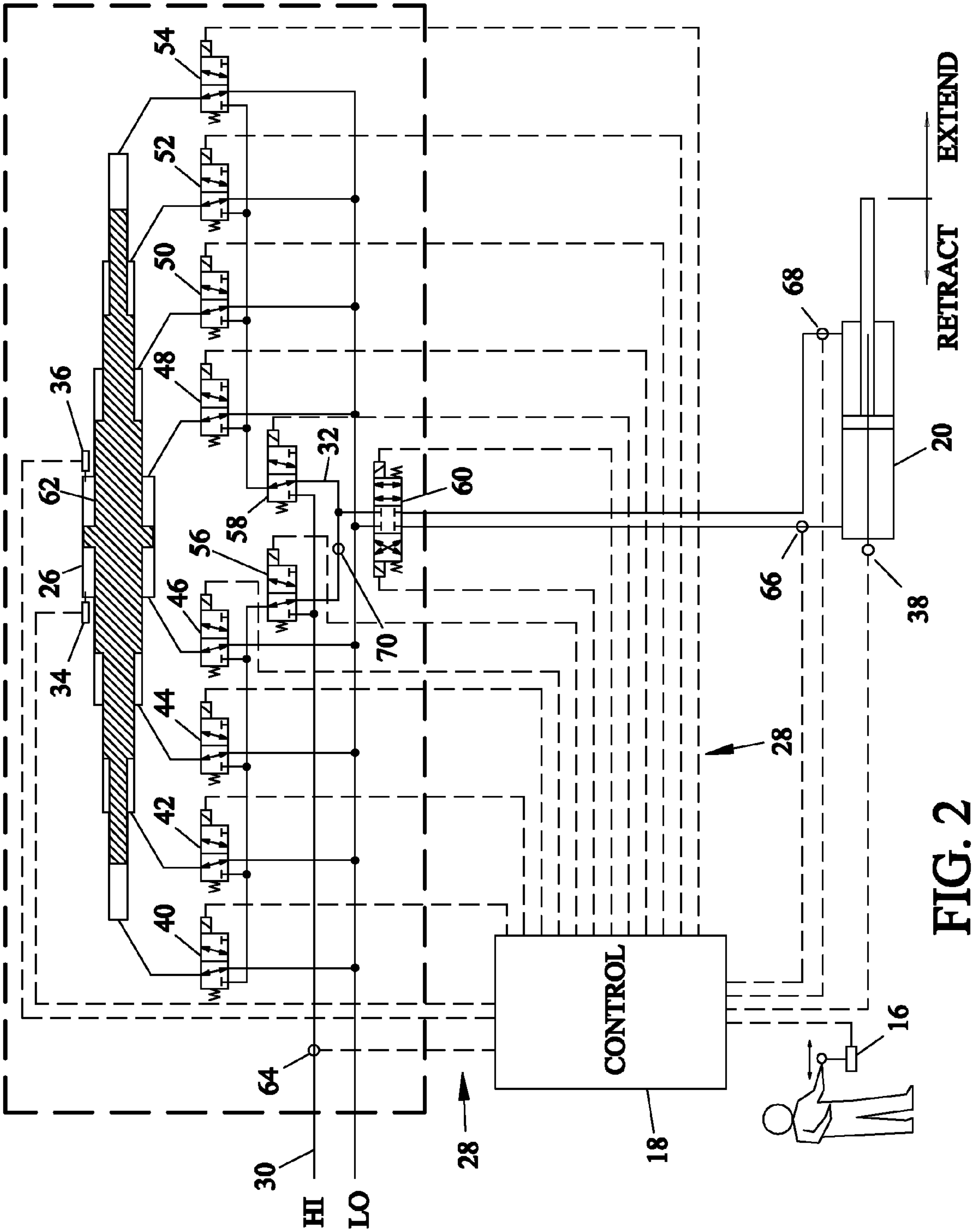
FIG. 2 is a schematical illustration of an embodiment of digital hydraulic system of the present invention.
Figure 3:
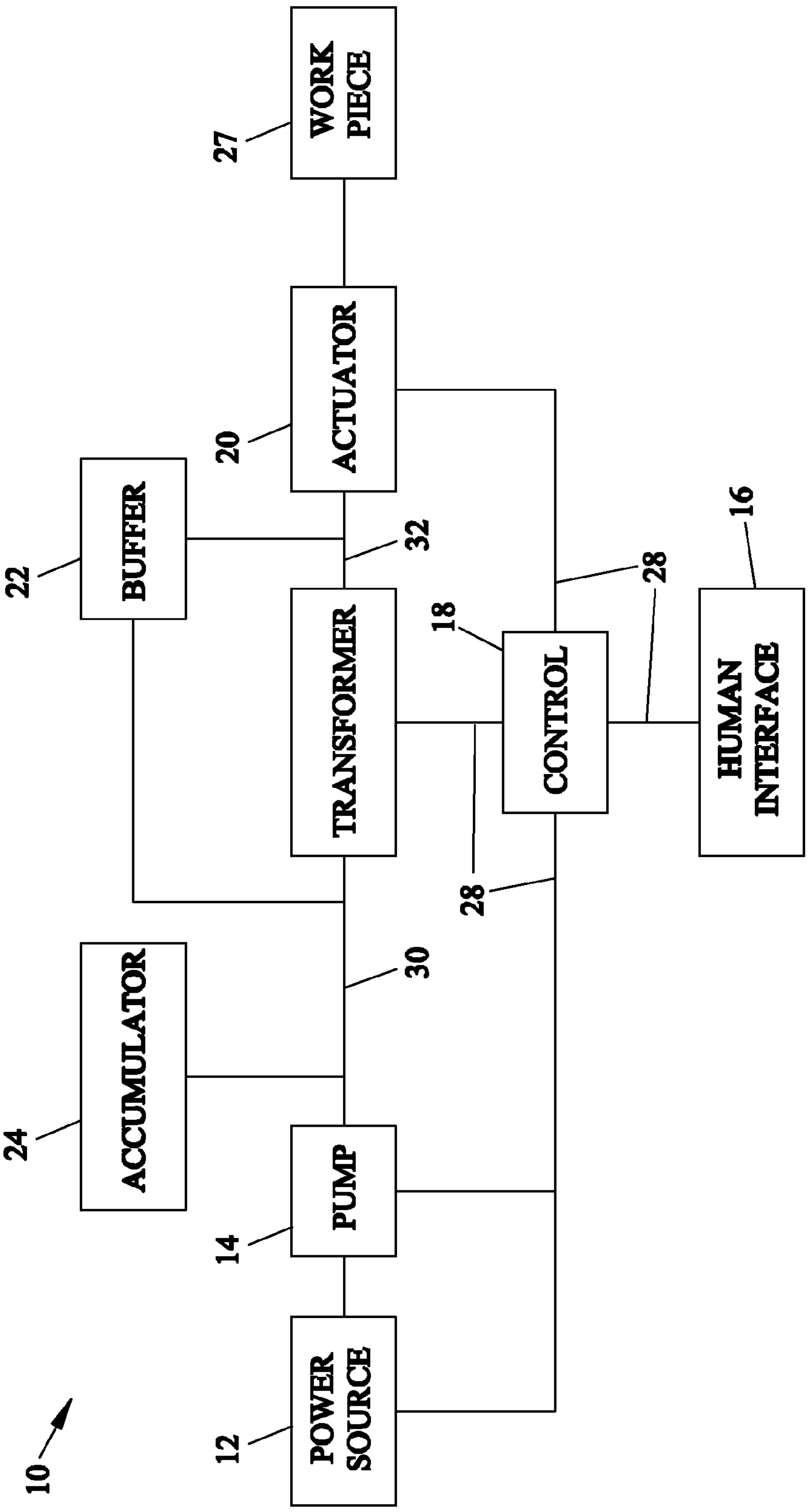
FIG. 3 is another schematical illustration of the digital hydraulic system of FIGS. 1 and 2.

Referring now to the drawings, and more particularly to FIGS. 1-3, there is shown a digital hydraulic system 10 being used in conjunction with a backhoe assembly. Digital hydraulic system 10 includes a power source 12, a pump 14, a human interface 16, a control system 18, an actuator 20, a buffering device 22, an accumulator 24, a digital hydraulic transformer 26, sense and control lines 28 and hydraulic lines 30 and 32. Power source 12 provides mechanical power to actuate pump 14 to serve as a hydraulic source to provide pressurized fluid/flow to digital hydraulic system 10. Pump 14 can be a typical hydraulic pump or may be a digital hydraulic pump 14 as described herein. Buffering device 22 serves an anti-cavitation function to absorb any impulses that may occur as the hydraulic fluid is switched by control system 18. Additionally, buffering device 22 may serve an accumulation function. Although not illustrated, pump 14 and actuator 20 may have buffering devices associated with each.

Human interface 16 can include a series of levers, to direct the operation of a piece of machinery, such as a backhoe. Human interface 16 is interactively connected with control system 18 to provide desired movement information from the operator to control system 18. Control system 18 communicates with human interface 16 as well as to pump 14, transformer 26 and actuator 20. Transformer 26 includes a transtatic bridge 62 that schematically appears as a stepped cylinder in FIG. 2 inside of a housing. Transtatic bridge 62 is not mechanically linked to anything outside of the housing and serves to transform a force against selected areas on one side to the fluid in other selected areas on the other side of transtatic bridge 62. Unlike transtatic bridge 62 of hydraulic transformer 26, the transtatic bridges that may be in pump 14 and/or actuator 20 may have a mechanical linkage that are respectively linked to a power source and a working piece.

Control system 18 can also receive information from power source 12 and send instructions to power source 12 to alter the function of power source 12. Control system 18 monitors pressure in accumulator 24. Control system 18 can alter the pressure/fluid flow from pump 14 based upon a need to move actuator 20. Further, control system 18 controls transformer 26 to adjust pressure in hydraulic line 32. Control system 18 also reacts to loads encountered by actuator 20 such that when movement by actuator 20 is in a direction that lowers the potential energy of a raised mass, such as a bucket full of dirt, then the lowering of the mass along with the weight of the mechanism can be used to increase the pressure in accumulator 24. In a like manner, control system 18 can utilize pressure on one side of transtatic bridge 62 to alter the pressure on another side of transtatic bridge 62. For example, if accumulator 24 has reached a maximum pressure and hydraulic line 32 has a less than a desired pressure, transtatic bridge 62 can translate pressure from accumulator 24 to provide energy to hydraulic line 32.

When human interface 16 indicates the movement of actuator 20 as desired, control system 18 actuates control valves based upon a calculated required pressure to be applied to actuator 20 in order to obtain the desired movement thereof. For example, if human interface 16 directs a work piece 27, which may be a tool 27, connected to actuator 20 to encounter an object that is to be pushed by movement of actuator 20, the position and movement of actuator 20 is monitored by control system 18 and appropriate pressure is supplied to hydraulic lines 32 by way of transtatic bridge 62, which draws energy from hydraulic line 30. So when tool 27 connected to actuator 20 encounters the object and human interface 16 indicates that tool 27 is to continue pushing, control system 18 detects either a slowed or stopped movement of tool 27 connected to actuator 20 and increases the pressure applied to actuator 20. Alternatively, actuator 20 is reconfigured by valves attached thereto to alter the pressurized cross-sectional area of actuator 20 to cause the tool to continue pressing against the encountered object. Control system 18 can balance the required pressure to be delivered from transtatic bridge, with that of cross-sectional area of actuator 20 so as to efficiently apply only the needed pressurized fluid in the required flow volume and pressure to cause the desired movement of actuator 20, based upon instructions from human interface 16.

For the sake of simplicity, a single pump and actuator control has been illustrated. However, the use of digital hydraulic components such as multiple actuators, transtatic bridges and/or pumps is also contemplated. Further, interaction of multiple control systems associated with selected sets of digital hydraulic components is also contemplated.

Figure 4:
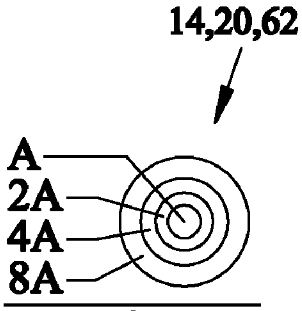
FIG. 4 is an illustrative table showing multiple operation modes of the digital hydraulic system of FIGS. 1-3.
Figure 4:

Now, additionally referring to FIG. 4, there is shown a schematic illustration of the operating of a transtatic bridge embodied here as a step cylinder having four separate cross-sectional areas, which illustratively yield sixteen combinations of operation available from the selection of portions of the active areas under pressure in transformer 26, actuator 20 and/or pump 14. For example, mode 1 illustrates that none of the area has been selected by control system 18. In mode 2, the smallest area is selected which is illustrated as the most central portion, which can indicate the pressures applied to the specified area. In mode three the area selected is twice area A and each stepped area is double the previous stepped area resulting in a binary digital hydraulic system. The selection of a desired cumulative area thereby directs the amount of pressure against a sealed piston to result in mechanical movement.

The following table illustrates how the mode of operation relates to the binary selection of areas of a digital cylinder/piston arrangement of the present invention. The cumulative area relates to the ratio of the pressure of the high pressure line that is transferred. In transtatic bridge 62 of hydraulic transformer 26 the ratios are selectable on both sides so as to allow 143 unique overall ratios of pressure conversion. This is assuming that the areas on each side of transtatic bridge 62 are substantially the same. It is possible to have the two sides of transtatic bridge 62 to not be mirror images of each other, but for the ease of illustration such is illustrated and described herein. The transtatic bridge of actuator 20 may have a different total area than transtatic bridge 62 and if it has four selectively pressurized sections as discussed herein, then the overall possibilities of unique power selections exceed 2,000. Differing numbers of pressurized sections and working area sizes are contemplated as a part of the present invention.

| MODE OF OPERATION | 8A | 4A | 2A | A | CUMULATIVE AREA | RATIO | TRANSFOM PRESSURE |
|---|---|---|---|---|---|---|---|
| 1 | 0 | 0 | 0 | 0 | 0 | 0:15 | 0 |
| 2 | 0 | 0 | 0 | 1 | A | 1:15 | Ph/15 |
| 3 | 0 | 0 | 1 | 0 | 2A | 2:15 | 2 * Ph/15 |
| 4 | 0 | 0 | 1 | 1 | 3A | 3:15 | 3 * Ph/15 |
| 5 | 0 | 1 | 0 | 0 | 4A | 4:15 | 4 * Ph/15 |
| 6 | 0 | 1 | 0 | 1 | 5A | 5:15 | 5 * Ph/15 |
| 7 | 0 | 1 | 1 | 0 | 6A | 6:15 | 6 * Ph/15 |
| 8 | 0 | 1 | 1 | 1 | 7A | 7:15 | 7 * Ph/15 |
| 9 | 1 | 0 | 0 | 0 | 8A | 8:15 | 8 * Ph/15 |
| 10 | 1 | 0 | 0 | 1 | 9A | 9:15 | 9 * Ph/15 |
| 11 | 1 | 0 | 1 | 0 | 10A | 10:15 | 10 * Ph/15 |
| 12 | 1 | 0 | 1 | 1 | 11A | 11:15 | 11 * Ph/15 |
| 13 | 1 | 1 | 0 | 0 | 12A | 12:15 | 12 * Ph/15 |
| 14 | 1 | 1 | 0 | 1 | 13A | 13:15 | 13 * Ph/15 |
| 15 | 1 | 1 | 1 | 0 | 14A | 14:15 | 14 * Ph/15 |
| 16 | 1 | 1 | 1 | 1 | 15A | 15:15 | 15 * Ph/15 |

As can be seen in FIG. 2, transtatic bridge 62 is located within stepped cavities having hydraulic flow lines connected by way of valves. For the sake of illustration, position sensors 34 and 36 are associated with transtatic bridge 62 and position sensor 38 is associated with actuator 20, herein illustrated as a simple dual acting cylinder. Valves 40, 42, 44 and 46 are associated with one side of transtatic bridge 62 and valves 48, 50, 52 and 54 are associated with an opposite side of transtatic bridge 62. Valves 56 and 58 allow for the switching of the high pressure line to opposite sides of transtatic bridge 62. Valve 60 allows for the reversed application of pressure to reach the actuator cylinder. Additionally valve 60 may be kept in a closed position until pressure, as measured by pressure sensor 70 is at the proper level to be applied to actuator 20.

As illustrated in FIG. 2, transtatic bridge 62 may be utilized to step the pressure up from the pressure contained in the high pressure line or step it down. For example, if the actuator is commanded to extend by the user in operation of human interface 16, control 18 would sense the command and cause valve 60 to shift to the right thereby connecting the low pressure line to the right side of the working cylinder and the left side of the working cylinder being connected to an output of transtatic bridge 62. For the lowest level of pressure, valve 40 is shifted to the left and valves 48, 50, 52 and 54 are likewise shifted to the left and valve 56 is shifted to the left thereby completing the fluid circuit to cause fluid flow from the high pressure line through valve 56 and valve 40, which would represent a mode 2 operation on the left side of transtatic bridge 62. The mode on the right side of transtatic bridge 62 would be in a mode 16 thereby causing the pressure of the fluid flowing to the left side of the actuator to be $1/15^{th}$ of the pressure in the high pressure line. As can be understood, the selective positioning of valves 40, 42, 44 and 46 alter the amount of pressure driving transtatic bridge 62 and the selective use of valves 48, 50, 52 and 54 on the opposite side of transtatic bridge 62 selects the desired output pressure to be applied to the actuator when valves 56 and 58 are so positioned. Numerous combinations then of output pressure are available by the selective use of valves 40-54. When transtatic bridge 62 approaches either position sensor 34 or 36, valves 56 and 58 can be simultaneously reversed from their position along with an appropriate reversal of valves 40-54 so that when transtatic bridge 62 travels in an opposite direction it still supplies the desired pressure of hydraulic fluid to the actuator. Pressure sensors 64, 66, 68 and 70 provide information to control system 18 to optimally control the function of transtatic bridge 62.

Understanding of the control of transtatic bridge 62 allows for an easy understanding of transtatic bridge 118 of single acting actuator 100 having valves 102, 104, 106 and 108 that are hydraulically connected with pressure cylinders 110, 112, 114 and 116, respectively. Pressure cylinders 110-116 are illustrated in schematic form and have stepped progressions, which for purposes of illustration can be understood to equate to the binarily oriented sixteen modes of FIG. 4 although different increments are also contemplated. Actuator 100 is connected to high and low hydraulic lines, which can come directly from the pump, an accumulator or from the pressure created by transtatic bridge 62. For ease of illustration the actual source of the pressure is not shown. The position of actuator 100 is detected by a position sensor, not shown, and when a new position is desired control system 18 selectively activates one or more of valves 102, 104, 106 and 108. For example, for the least amount of force from actuator 100, only valve 108 is activated causing the high pressure line to be directed to pressure cylinder 116. In a like manner, as described above, combinations of the activation of valves 102-108 apply hydraulic fluid to a selected cross sectional area of actuator 100. This tailoring of fluid connections allows the selected pressure cylinders to efficiently move shaft 120 of actuator 100 without relying upon a throttling method or dropping pressure through a flow rate reducer, which is common in the industry. The more efficient use of a pressurized hydraulic source by the present invention reduces the amount of energy required from power source 12 to operate hydraulic system 10 as compared to current hydraulic systems.

Figure 5:
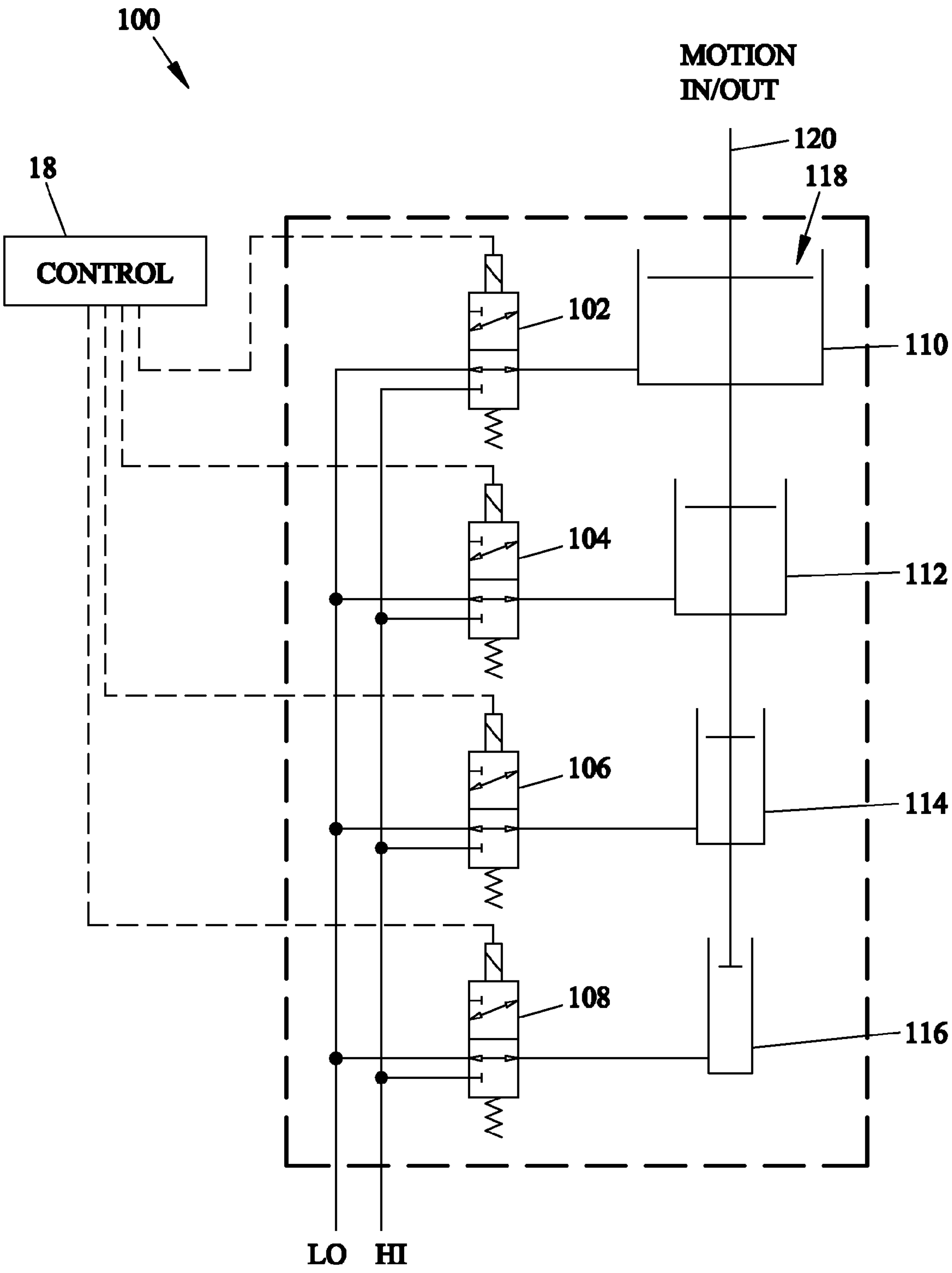
FIG. 5 is a schematical illustration of an actuator/pump used by the digital hydraulic system of FIGS. 1-3.
Figure 6:
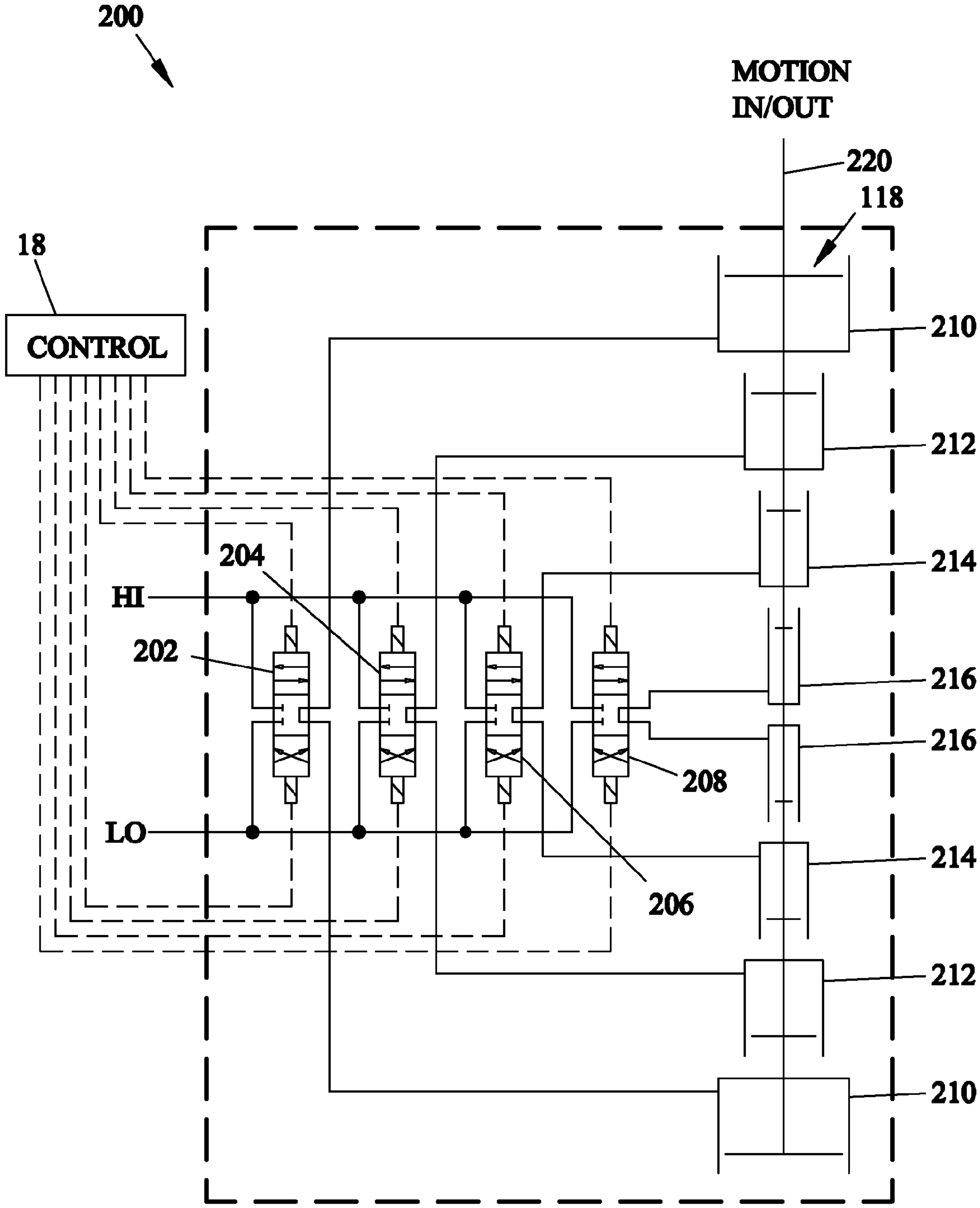
FIG. 6 is a schematical illustration of a double acting actuator/pump usable by the hydraulic system of FIGS. 1-3.

Now, additionally referring to FIG. 6, there is shown a double acting actuator 200 having valves 202, 204, 206 and 208 operatively connected to opposing pressure cylinder pairs 210, 212, 214 and 216 of transtatic bridge 218. The selective actuation of valves 202-208 cause a powered movement in both directions for reasons similar to those explained relative to FIG. 5. A shaft 220 may be attached to transtatic bridge 218 to convey force into/out of actuator 200.

Figure 7:
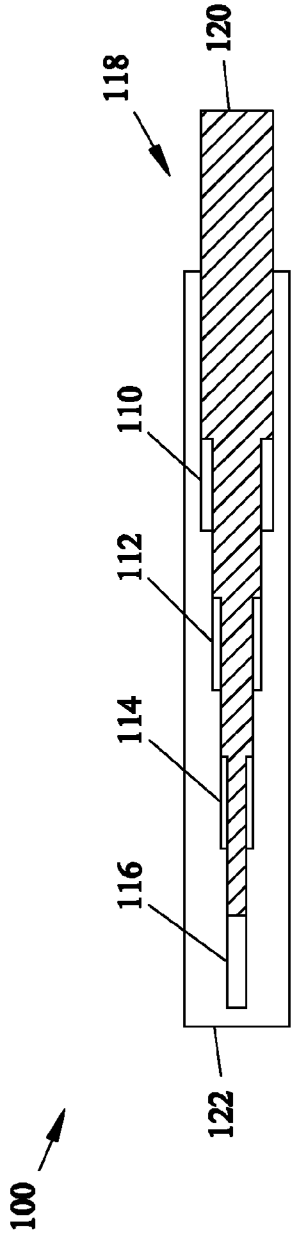
FIG. 7 is a schematical cross-sectional view of single acting pump/actuator of FIG. 5.
Figure 8:
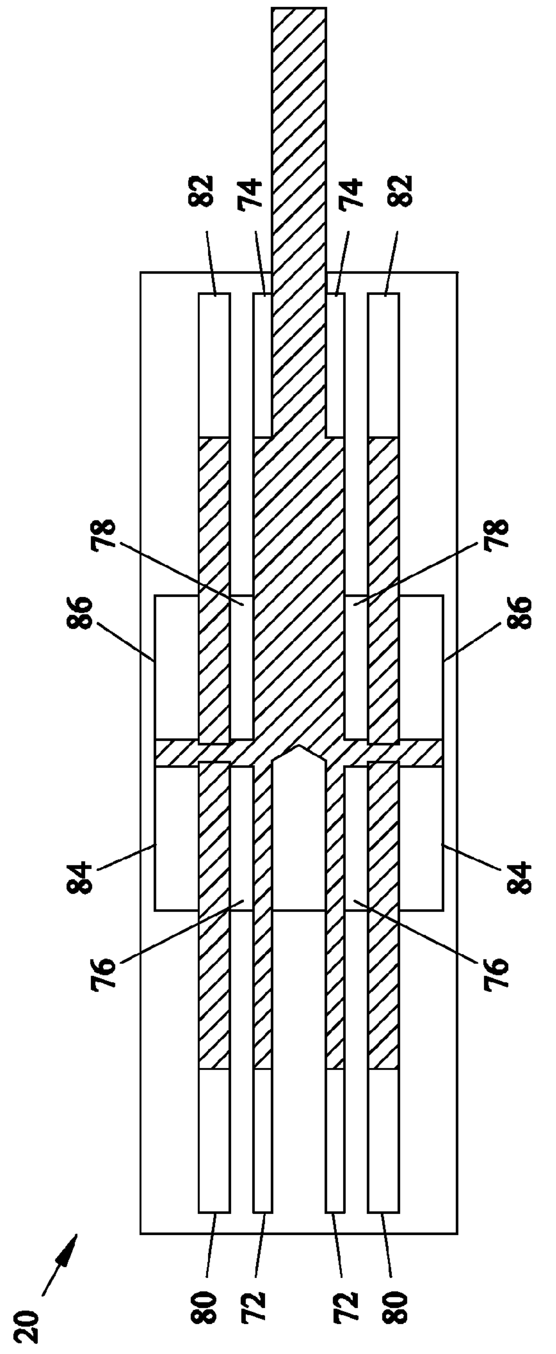
FIG. 8 is a cross-sectional schematical illustration of a double acting pump/actuator of FIG. 6.

Two cross-sectional examples are provided in FIGS. 7 and 8 to show how different pressurized cavities can be utilized to produce an actuator/pump in accordance with the present invention. The pressurized cavities of FIG. 7 correspond nicely with the end view presented in FIG. 4 and the schematical presentation in FIG. 5, showing four separate pressurized areas. These areas can be separately pressurized to cause the movement of shaft 120 within housing 122. In FIG. 8, another embodiment of an actuator 20 or 200 having a geometry that again has working areas that are selectively pressurized and which are annular in nature. For example, working area 72 is opposite matched working area 74 on the opposite end thereof. In a like manner area 76 is opposite 78, area 80 is opposite area 82 and area 84 is opposite area 86. The selective pressurization of different sides of working areas 72-86 modify the direction and force applied to the shaft extending from actuator 20. The annular geometry of FIG. 8 is again binarily related with the working areas being associated by a factor of two.

Figure 9:
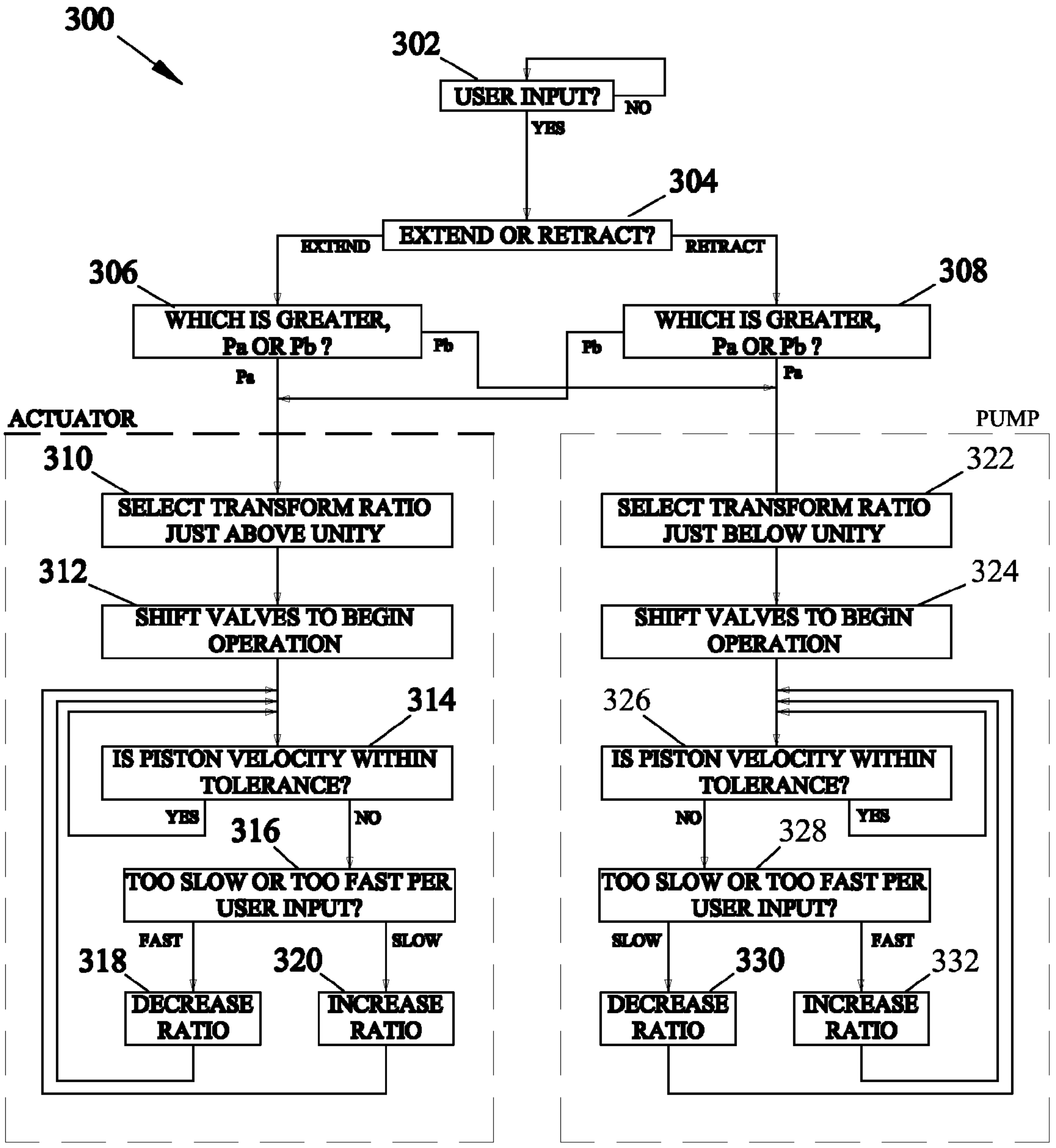
FIG. 9 is a schematical flow diagram of a control method utilizing the digital hydraulic system of FIGS. 1-8.

Now, additionally referring to FIG. 9 is an illustrative method 300 that utilizes the digital features of hydraulic system 10. A user input is detected at step 302 and the direction is selected at step 304 as to whether actuator 20 should extend or retract. If the command from the user is to extend actuator 20, then the method proceeds to step 306. If the command from the user is to retract actuator 20, then the method proceeds to step 308. Steps 306 and 308 are similar in that a determination is made as to which side of the working cylinder has the largest pressure. If at step 306 the largest pressure is detected at transducer Pb then actuator/pump 20 functions as a pump to increase the pressure in an accumulator 24. If at step 306 if pressure is greater at transducer Pa then actuator/pump 20 functions as an actuator. Continuing along the flow of Pa being greater than Pb then a transform ratio is selected for the valves to be actuated at step 310. At step 312 the valves are engaged causing the operation to begin. If the piston velocity is within a predetermined tolerance then no action is taken at step 314. However, if the piston velocity is not within a predetermined tolerance then an indication of the position as it changes with time is determined at step 316 to determine if the piston velocity is too slow or too fast as compared to the required user input detected at step 302. If the movement is too fast then the transform ratio is decreased at step 318. If it is determined that movement of the actuator is too slow then the transform ratio is increased at step 320 by selectively engaging valves similar to step 312.

In a like manner if the pressure detected by the Pb transducer is greater than Pa then actuator 20 functions as a pump thereby recovering energy from the movement of the load held by actuator/pump 20. In a manner somewhat similar to the functioning of an actuator the transform ratio is selected just below unity at step 322, which means that the actuator will then retract. Valves are shifted to begin the operation at step 324 and the movement is monitored at step 326 to determine if the piston velocity is within a predetermined tolerance. If the piston velocity is not within tolerance then a determination is made at step 328 as to whether the piston velocity is too slow or too fast as compared to the input required by the user at step 302. If the movement is too slow then the transform ratio is reduced at step 330 and valves are reoriented similar to step 324 to alter the velocity of the piston. If at step 328 it is determined that piston velocity is too fast then the transform ratio is increased, thereby causing increased resistance to movement of the actuator, thereby increasing pressure in accumulator 24.

Figure 10:
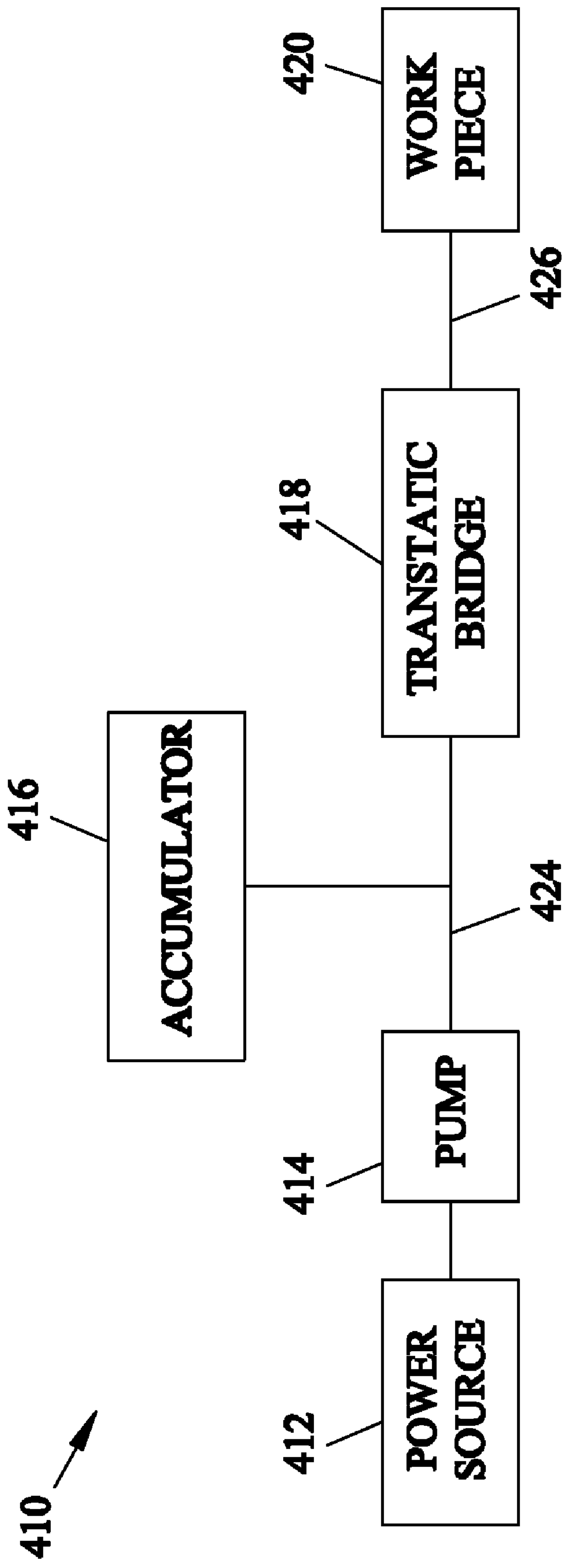
FIG. 10 is another embodiment of a digital hydraulic system of the present invention.

Now, additionally referring to FIG. 10, there is shown another embodiment of the present invention including digital hydraulic system 410 including a power source 412, a pump 414, an accumulator 416 and a transtatic bridge 418 operatively connected to a work piece 420. The prime mover that provides mechanical work to the system is power source 412, which is mechanically linked by linkage 422 to pump 414. Pump 414 is a hydraulic source of pressure and flow, and may be a digital pump 14 as described herein being under the control of a system that selects portions of a transtatic bridge within pump 14 to control the flow and pressure delivered to hydraulic line 424. Accumulator 416 stores and releases pressurized fluid by way of hydraulic line 424. Transtatic bridge 418 is a transtatic bridge as described above and may be single or double acting. A linkage 426 may be a mechanical linkage 426 such as a shaft 426 that is connected to work piece 420 for the controllable movement thereof. Alternatively, linkage 426 may be a fluidic linkage that provides fluid pressure/flow to work piece 420. For the sake of simplicity the valves and control system associated with system 410 have not been shown but would include the control and valve elements described herein to direct force to/from work piece 420.

Pump 14 again can be identical or substantially identical with an actuator 20 in its construct and control by control system 18. Pump 14 can be also known as a variable displacement linear pump (VDLP) 14, which can displace a variable amount of fluid per unit length of stroke or allow variable stroke per unit of volume displaced. Its function depends upon how it is plumbed and controlled, that is, whether a constant force on the piston or a constant fluid pressure is required from the VDLP. Considering that virtually any low frequency random oscillating motion could be harnessed as a usable energy source, many applications are possible for the VDLP beyond the energy supplied by way of a typical power source, such as an internal combustion engine. One potential application of the VDLP of the present invention could be a shock absorber on a vehicle, such as an automobile or bus. The device, when utilized in such an application, would displace a progressively larger amount of fluid per unit length of stroke as the velocity of the piston increases. This would function to cause greater resistance to motion and a greater fluid displacement as the piston velocity increases. Whenever a powerful random motion has to be damped or the need for an extreme hydraulic efficiency is present, the VDLP can be utilized to transform motion to a usable pressurized hydraulic flow. Digital hydraulic systems of the present invention allow a new flexibility of design applications.

In a like manner a variable displacement linear actuator (VDLA) 20 may deliver a variable force output throughout its stroke with near instantaneous control response and near perfect efficiency as compared to conventional hydraulic systems. The double acting variable displacement linear actuator permits four quadrant operation, in which operational transition is seamless throughout the entire range of motoring and pumping. For example, a four quadrant linear actuator can produce a variable force in either direction while moving in either direction at nearly any velocity. If a control signal is sent by way of control system 18 to actuator 20 to produce some specific force in a particular direction and the opposing force of the load against it is less, the opposition force is overpowered, and the mechanism, along with the load, accelerate in the direction of the actuator force. If however, the opposing force of the load is greater than the force output of the VDLA, the mechanism and load travel in an opposite direction thereby causing the VDLA to operate as a VDLP.

The digital hydraulic transformer (DHT), converts hydraulic energy by way of transtatic bridge 62. An input flow at a given pressure can be converted to an output flow at another pressure level with minimal loss. The conversion is also reversible, as the product of the input pressure and flow is equal to the product of output pressure and flow. The transtatic bridge in pump 14 is connected to power source 12 to mechanically move the transtatic bridge so that the selectable flow and pressure of the working hydraulic fluid from pump 14 is produced. In a like manner, particularly since actuator 20 and pump 14 can be substantially similar, the transtatic bridge of actuator 20 can be connected to a work piece or load, so that the selected flow and pressure of the hydraulic fluid directed to the transtatic bridge determines the force applied to the work piece. Transtatic bridge 62 of hydraulic transformer 26 is not mechanically linked to a motive force or to a load. Rather transtatic bridge 62 serves to transfer one force-flow product to another force-flow product.

In operation the digital hydraulic system of the present invention may present discrete pressures and flows, which may be altered by an interpolation method to provide a pressure and/or flow that is between the discrete selections. The interpolation methods include frequency modulation by the control system to vary the selection of adjacent discrete pressures/flows to provide a selection between the discrete outputs. Similarly a pulse width modulation technique can be used to interpolate the pressure/flow. Additionally, a servo valve, a throttling technique and/or a modulation of a poppet valve is contemplated to slightly alter a discrete output.

Now additionally referring to FIGS. 11-14, there is shown a control system 590 being used in conjunction with a hydraulic excavator assembly. Control system 590 receives input from sensors 608 and estimating device 610. It is contemplated that control system 590 also receives information from digital hydraulic transformer 588. Control system 590 controls hydraulic energy source 580. Sensors 608 include sensors 592, 594, 596, 598 and 600. Hydraulic energy source 580 includes a prime mover 582 and a hydraulic pump 584. Alternatively, hydraulic energy source 580 can include a prime mover-pump combination such as a free piston engine-pump, not shown.

Prime mover 582 drives hydraulic pump 584. Prime mover 582 can be an internal combustion engine, an electric motor or some other type of power providing apparatus. Hydraulic pump 584 can be a fixed displacement hydraulic pump or a variable displacement hydraulic pump. Prime mover 582 drives hydraulic pump 584 adding pressurized hydraulic fluid to accumulator 586 up to a fill level determined by control system 590. Control system 590 determines a fill level of accumulator 586 based on input from sensors 608. Digital hydraulic transformer 588 is fluidly connected to hydraulic energy source 580 and hydraulic accumulator 586. Digital hydraulic transformer 588 is also connected to hydraulic cylinder 540. Hydraulic cylinder 540 is operatively connected to load 602. Load 602 can act on cylinder 540 in the direction of direction of arrow 604 or arrow 606 depending upon the position of load 602 in a gravitational field. As load 602 is raised to an elevated position in a gravitational field it gains potential energy. As load 602 is lowered to a lower position in the gravitational field it loses potential energy. If load 602 is moving in a direction and has mass it has kinetic energy. Digital hydraulic transformer 588 transfers energy between hydraulic accumulator 586 and hydraulic cylinder 540. In the event that load 602 is moving in the opposite direction as load 602 is acting on cylinder 540, energy is transferred from accumulator 586 to load 602. In the event that load 602 is moving in the same direction as load 602 is acting on cylinder 540, then energy is transferred from load 602 to accumulator 586. In the event that load 602 is in motion and is caused to stop, the kinetic energy is transferred from load 602 through digital hydraulic transformer 588 into accumulator 586. Estimating device 610 receives input from sensors 608. Estimating device 610 estimates the amount of potential energy and kinetic energy in load 602 based on input from sensors 608. Control system 590 controls hydraulic energy source 580 to allow sufficient capacity for additional hydraulic fluid in hydraulic accumulator 586 such that an amount of hydraulic energy approximately equal to the sum of potential energy and kinetic energy in load 602, in the form of a volume of pressurized hydraulic fluid, is able to be added to accumulator 586.

Figure 11:
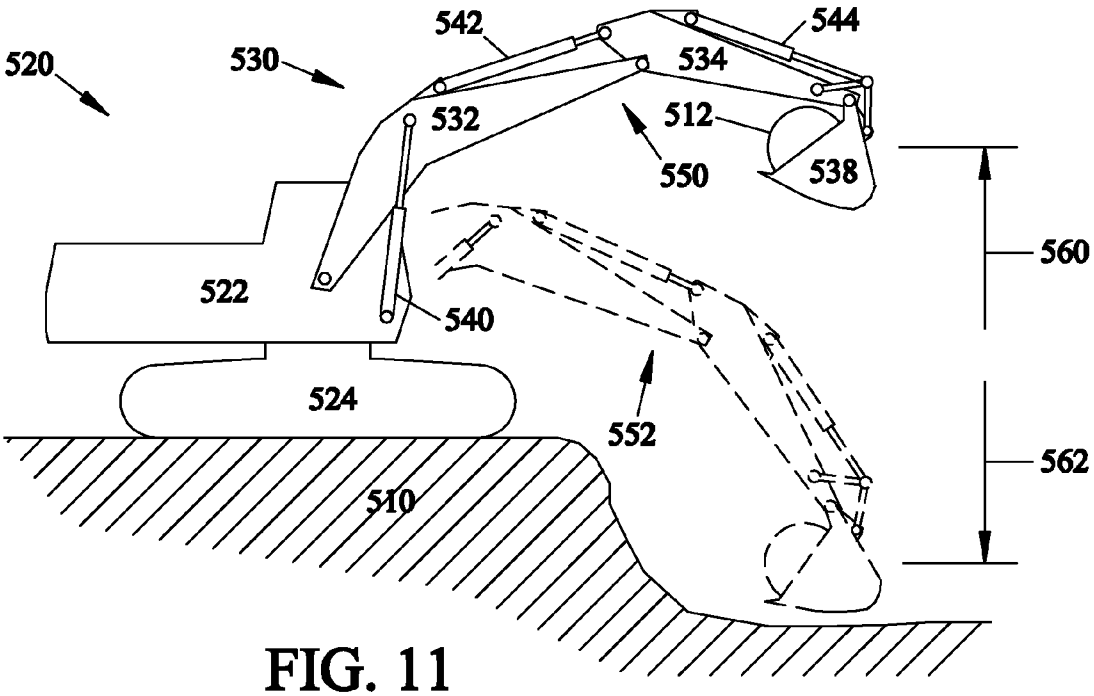
FIG. 11. illustrates a side view of a hydraulic excavator utilizing another embodiment of the energy management system of the present invention.
Figure 12:
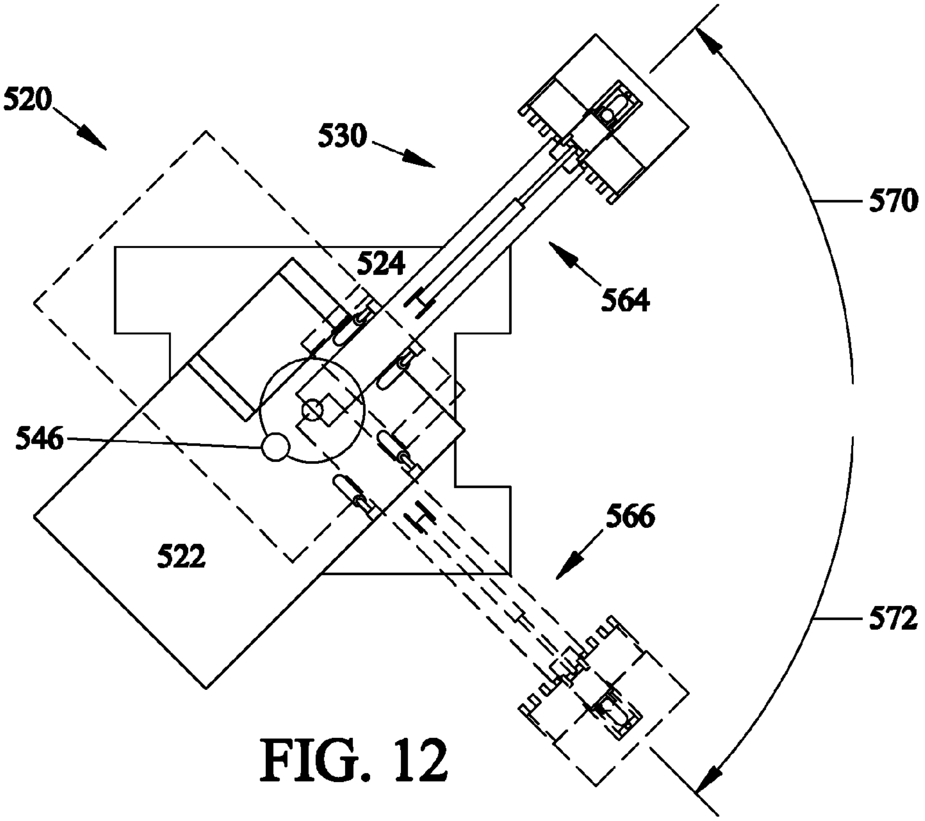
FIG. 12 illustrates a top view of the hydraulic excavator of FIG. 11.
Figure 13:
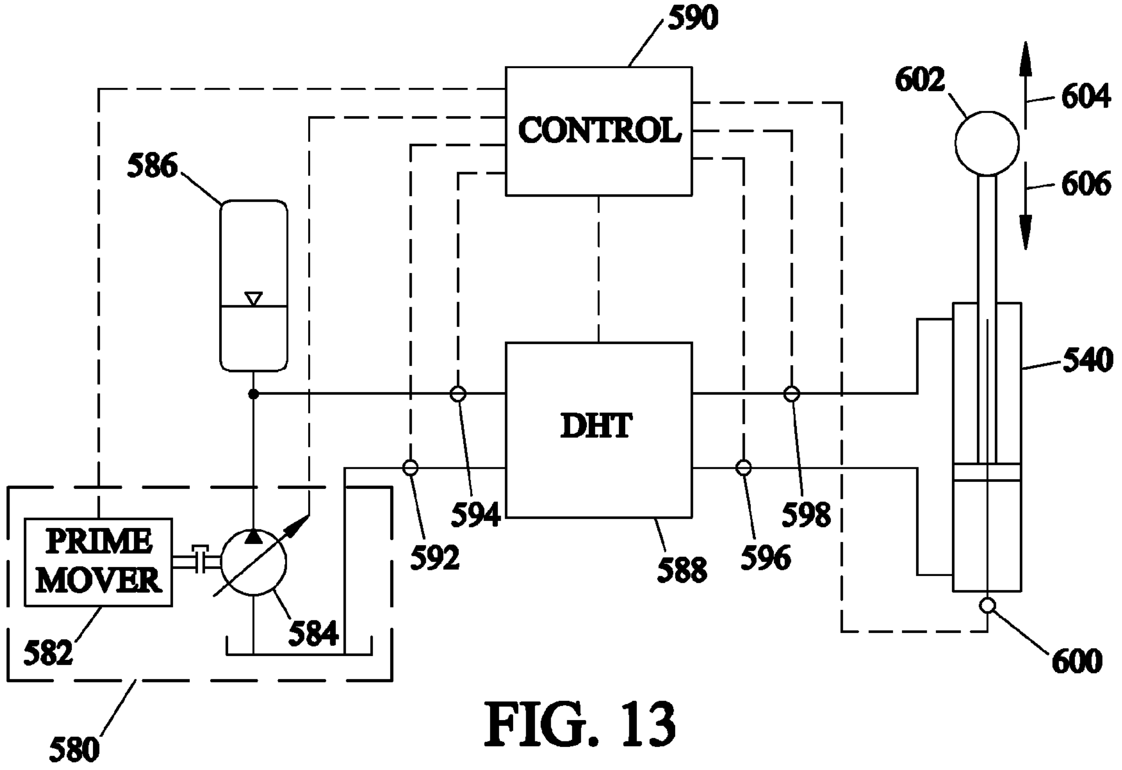
FIG. 13 is a schematical illustration of the energy management system of FIGS. 11 and 12.
Figure 14:
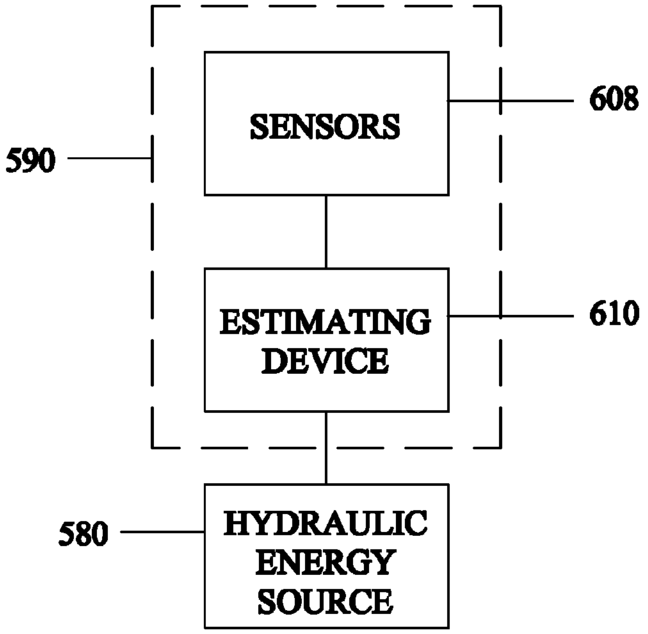
FIG. 14 is another schematical illustration of the energy management system of FIGS. 11 and 12.

Work machine 520 is comprised of stationary structure 524 and rotatable structure 522. Stationary structure 524 is engaged with ground 510, and rotatable structure 522 is rotatable with respect to stationary structure 524 by swing drive 546. Onto rotatable structure 522 implement 530 is operatively mounted, which illustratively includes boom 532, stick 534 and bucket 538. Implement 530 is movable by hydraulic cylinder 540 with respect to rotatable structure 522, and is shown engaging load 512. Two positions of implement 530 are shown in FIG. 11: position 550 and position 552. Two positions of rotating structure 522 are shown in FIG. 12: position 564 and position 566.

When work machine 520 raises implement 530 from position 552 to position 550 in the direction of arrow 560, implement 530 and the engaged load 512 gain potential energy.

When work machine 520 lowers implement 530 from position 550 to position 552 in the direction of arrow 562, implement 530 and the engaged load 512 loses potential energy. Also while implement 530 is in motion in the direction of arrow 560 or arrow 562, implement 530 and the engaged load 512 possesses kinetic energy. Control system 590 receives input from sensors 608 to estimate the potential energy in implement 530 and load 512 acting together on cylinder 540 as load 602. Based on the estimate of potential energy and kinetic energy in load 602, control system 590 lowers the target fill level of hydraulic fluid in accumulator 586 to leave enough capacity for the redistribution of the potential energy and kinetic energy in load 602 in the event that load 602 is lowered and/or brought to a stop.

Similarly, rotating structure 522, while rotating from position 564 to position 566, possesses kinetic energy. Swing drive 546 applies a force to rotating structure 522 in the direction of direction arrow 572 to accelerate rotating structure 522 in the direction of direction arrow 572. To bring rotating structure 522 to a stop at position 566, swing drive 546 applies a force to rotating structure 522 in the direction of arrow 570, and thus acts as a pump transferring kinetic energy to the accumulator.

Control system 590 receives input from sensors 608 to estimate the kinetic energy in rotating structure 522 and lowers the target fill level of hydraulic fluid in accumulator 586 to leave enough capacity for the redistribution of the kinetic energy in rotating structure 522 in the event that rotating structure 522 is brought to a stop.

For the sake of clarity, a single hydraulic energy source, digital hydraulic transformer and actuator control has been illustrated. It is to be understood that the use of multiple hydraulic energy sources, digital hydraulic transformers and/or hydraulic actuators, such as illustrated by cylinders 542 and 544, along with swing drive 546, is also contemplated. Further, interaction of multiple control systems associated with the control of individual digital hydraulic transformers and energy management systems are additionally contemplated.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A control system for a work machine having a hydraulic energy source, a hydraulic accumulator fluidically couplable with the hydraulic energy source, a digital hydraulic system having a digital hydraulic transformer fluidically couplable with the hydraulic accumulator and a hydraulic actuator fluidically couplable with the digital hydraulic transformer, and a movable element movable by the hydraulic actuator, the control system comprising:

means to estimate at least one of potential energy and kinetic energy in the movable element;

means to measure an attribute of the hydraulic fluid in the hydraulic accumulator; and means to vary an amount of hydraulic energy added to the hydraulic accumulator by the hydraulic energy source dependent upon at least one of said potential energy, said kinetic energy and said attribute of the hydraulic fluid in the hydraulic accumulator.

2. The control system of claim 1, wherein said attribute is a fill level of the hydraulic fluid in the hydraulic accumulator.

3. The control system of claim 1, wherein the movable element of the work machine includes a first movable element and a second movable element coupled to said first movable element.

4. The control system of claim 1, wherein said means to measure an attribute of the hydraulic fluid in the hydraulic accumulator includes at least one of a position sensor sensing the position of a piston slidably contained within the accumulator and a pressure sensor sensing the pressure of hydraulic fluid in the hydraulic accumulator.

5. The control system of claim 1, wherein said means to estimate at least one of potential energy and kinetic energy in the movable element further comprises a means to measure a position of the movable element.

6. The control system of claim 1, wherein said means to estimate at least one of potential energy and kinetic energy in the movable element further comprises a means to measure a pressure of hydraulic fluid in an actuator moving the movable element.

7. The control system of claim 1, wherein said means to estimate at least one of potential energy and kinetic energy further comprises at least one of a position sensing means sensing a position of the movable element and a pressure sensing means sensing a pressure of hydraulic fluid in the actuator.

8. The control system of claim 1, wherein said means to estimate at least one of potential energy and kinetic energy further comprises a means to estimate a velocity of the movable element.

9. A control system for a work machine, the control system comprising:

means to measure an attribute of hydraulic fluid in a hydraulic accumulator that is fluidically coupled to a hydraulic energy source;

means to estimate at least one of potential energy and kinetic energy in a movable element of the work machine, said movable element movable by a hydraulic actuator fluidically coupled with a digital hydraulic transformer that is fluidically coupled with said hydraulic accumulator; and means to vary an amount of hydraulic energy added to said hydraulic accumulator by said hydraulic energy source responsive to at least one of said potential energy, said kinetic energy and said attribute of the hydraulic fluid in said hydraulic accumulator.

10. The control system of claim 9, wherein said attribute is a fill level of the hydraulic fluid in the hydraulic accumulator.

11. The control system of claim 9, wherein said means to measure an attribute of the hydraulic fluid in the hydraulic accumulator includes at least one of a position sensor sensing the position of a piston slidably contained within the accumulator and a pressure sensor sensing the pressure of hydraulic fluid in the hydraulic accumulator.

12. The control system of claim 9, wherein said means to estimate at least one of potential energy and kinetic energy in the movable element further comprises a means to measure a position of the movable element.

13. The control system of claim 9, wherein said means to estimate at least one of potential energy and kinetic energy in the movable element further comprises a means to measure a pressure of hydraulic fluid in the actuator moving the movable element.

14. The control system of claim 9, wherein said means to estimate at least one of potential energy and kinetic energy further comprises at least one of a position sensing means sensing a position of the movable element and a pressure sensing means sensing a pressure of hydraulic fluid in the actuator.

15. The control system of claim 9, wherein said means to estimate at least one of potential energy and kinetic energy further comprises a means to estimate a velocity of the movable element.

16. A work machine, comprising:

a hydraulic energy source;

a hydraulic accumulator fluidically coupled with said hydraulic energy source;

a digital hydraulic system having:

a digital hydraulic transformer fluidically coupled with said hydraulic accumulator and a hydraulic actuator fluidically coupled with said digital hydraulic transformer; and a movable element movable by said hydraulic actuator; and a control system having:

means to estimate at least one of potential energy and kinetic energy in said movable element;

means to measure a fill level of hydraulic fluid in said hydraulic accumulator; and means to vary an amount of hydraulic energy added to said hydraulic accumulator by said hydraulic energy source responsive to at least one of said potential energy, said kinetic energy and said fill level of said hydraulic accumulator.

17. The work machine of claim 16, wherein said movable element includes a first movable element and a second movable element coupled to said first movable element.

18. The work machine of claim 16, wherein said means to measure a fill level of the hydraulic fluid in the hydraulic accumulator includes at least one of a position sensor sensing the position of a piston slidably contained within the accumulator and a pressure sensor sensing the pressure of hydraulic fluid in the hydraulic accumulator.

19. The work machine of claim 16, wherein said means to estimate at least one of potential energy and kinetic energy in the movable element further comprises a means to measure a position of the movable element.

20. The work machine of claim 16, wherein said means to estimate at least one of potential energy and kinetic energy in the movable element further comprises a means to measure a pressure of hydraulic fluid in an actuator moving the movable element.

* * * * *